United States Patent
Suga et al.

(10) Patent No.: US 6,964,429 B2
(45) Date of Patent: Nov. 15, 2005

(54) STROLLER

(75) Inventors: Nobuhide Suga, Saitama (JP); Kentaro Moriguchi, Saitama (JP)

(73) Assignee: Combi Corporation, Tokyo-to (JP)

( * ) Notice: Subject to any disclaimer, the term of this patent is extended or adjusted under 35 U.S.C. 154(b) by 34 days.

(21) Appl. No.: 10/246,523

(22) Filed: Sep. 19, 2002

(65) Prior Publication Data

US 2003/0052475 A1 Mar. 20, 2003

(30) Foreign Application Priority Data

Sep. 19, 2001 (JP) .......................................... 2001-285299
Oct. 15, 2001 (JP) .......................................... 2001-317362

(51) Int. Cl.$^7$ ................................................. B62B 1/00
(52) U.S. Cl. ........................ 280/642; 280/647; 280/650; 280/658; 280/47.38
(58) Field of Search ................................ 280/642, 643, 280/644, 645, 646, 647, 650, 656, 521, 655, 655.1, 657, 658, 42, 47.38, 47.41, 648, 652, 38; 403/83, 85, 326, 327, 102

(56) References Cited

U.S. PATENT DOCUMENTS

| | | | | |
|---|---|---|---|---|
| 3,989,295 A | | 11/1976 | Sparkes | |
| 4,317,581 A | * | 3/1982 | Kassai | 280/644 |
| 4,362,315 A | * | 12/1982 | Kassai | 280/650 |
| 4,435,012 A | * | 3/1984 | Kassai | 280/648 |
| RE31,760 E | | 12/1984 | Kassai | |
| 4,538,830 A | * | 9/1985 | Nakao et al. | 280/647 |
| 4,697,823 A | | 10/1987 | Kassai | |
| 4,828,278 A | * | 5/1989 | Shinroku et al. | 280/644 |
| 4,953,887 A | * | 9/1990 | Takahashi et al. | 280/647 |
| 5,110,150 A | * | 5/1992 | Chen | 280/642 |
| 5,181,735 A | * | 1/1993 | Onishi | 280/642 |
| 5,511,441 A | * | 4/1996 | Arai | 280/642 |
| 5,669,623 A | * | 9/1997 | Onishi | 280/642 |
| 5,676,419 A | | 10/1997 | Kassai | |
| 5,752,738 A | * | 5/1998 | Onishi et al. | 280/642 |
| 6,155,740 A | * | 12/2000 | Hartenstine | 403/102 |
| 6,422,587 B1 | * | 7/2002 | Yamazaki et al. | 280/647 |

* cited by examiner

*Primary Examiner*—Hau Phan
(74) *Attorney, Agent, or Firm*—Wenderoth, Lind & Ponack, L.L.P.

(57) ABSTRACT

A stroller includes armrests, rear legs pivotally joined to the armrests, respectively, a handle pivotally joined to the armrests, and brackets interconnecting the handle and the rear legs. The brackets engage with locking members mounted on lower end parts of side pipes of the handle. Holding members are supported on sides of the side pipes opposite to sides of the same with which the brackets are in contact with the side pipes by pins, respectively. When the stroller is folded in two, stopping parts of the locking members and stopping parts of the holding members are engaged, respectively.

19 Claims, 11 Drawing Sheets

STROLLER

BACKGROUND OF THE INVENTION

1. Field of the Invention

The present invention relates to a folding stroller and, more particularly, to a three-folding stroller capable of being locked in a two-folded state.

2. Description of the Related Art

A generally known folding stroller has a body frame consisting of front and back structures which can be pulled toward each other so that the folding stroller is folded into a compact state and a longitudinal dimension of the folding stroller is reduced. Hereinafter, this type of a folding stroller will be referred to as a two-folding stroller. Another generally known folding stroller has a body frame consisting of front and back structures which can be pulled toward each other so that a longitudinal dimension of the folding stroller can be reduced and can be further folded inwardly so that a lateral dimension of the folding stroller is reduced to further facilitate carrying the folding stroller. Hereinafter, this type of a folding stroller will be referred to as a three-folding stroller.

The foregoing known three-folding stroller is provided with a locking mechanism capable of locking the folding stroller only in a three-folded state, and is not provided with any locking mechanism for locking the three-folding stroller in a two-folded state. Thus, this three-folding stroller cannot be held in a two-folded state.

Therefore, it is difficult for a person to fold this known folding stroller with one hand while the other hand is holding a baby, and it is possible that the folding stroller unfolds accidentally when the folding stroller is folded temporarily in two to carry the folding stroller up or down stairs, because the folding stroller is not provided with any locking mechanism capable of locking the folding stroller in a two-folded state.

SUMMARY OF THE INVENTION

Accordingly, it is an object of the present invention to provide a three-folding stroller capable of surely remaining in a two-folded state.

According to one aspect of the present invention, a stroller comprises, as principal components: a pair of rear legs; and a handle connected to the pair of rear legs, wherein the pair of rear legs can be moved relative to the handle to folding positions for folding; and locking structure provided between the handle and the pair of rear legs, for maintaining the stroller in a folded state where the pair of rear legs are in the folding positions relative to the handle.

In the stroller according to the present invention, the rear legs and the handle are connected by brackets.

In the stroller according to the present invention, the locking structure includes two locking mechanisms. Each locking mechanism includes a locking member slidably mounted on an end part of the handle, and a holding member capable of turning together with the bracket relative to the handle, and the locking member and the holding member are provided with first stopping parts, respectively, and the first stopping parts are engaged with each other when the stroller is folded.

In the stroller according to the present invention, the holding member turns together with the bracket relative to the handle when the pair of rear legs are moved for folding relative to the handle, and respective first stopping parts of the holding member and the locking member are engaged with each other when the pair of rear legs are folded relative to the handle.

In the stroller according to the present invention, the locking member and the bracket are provided with second stopping parts, respectively, and the second locking parts are engaged with each other when the stroller is unfolded.

In the stroller according to the present invention, the locking member is urged toward the holding member via an elastic member.

In the stroller according to the present invention, the holding member has a working part capable of moving the locking member against force exerted by the elastic member while the holding member is being turned.

In the stroller according to the present invention, armrests are joined pivotally to the handle, and the rear legs are joined pivotally to the armrests, respectively.

In the stroller according to the present invention, the handle has a middle section and opposite side sections capable of being turned inwardly relative to the middle section, and the handle can be folded in three.

In the stroller according to the present invention, front legs are connected to the rear legs by side connecting bars, and the holding members are fixed to rear end parts of the side connecting bars, respectively.

According to another aspect of the present invention, a three-folding stroller comprises: a pair of rear legs; a handle connected to the pair of rear legs, the handle having opposite side parts turnable forwardly, wherein the pair of rear legs can be moved relative to the handle to folding positions for folding; and locking structure provided between the handle and the pair of rear legs, for maintaining the stroller in a folded state where the pair of rear legs is in a folding position relative to the handle.

According to a third aspect of the present invention, a stroller includes right and left front legs, right and left rear legs, a handle connected to the rear legs, side interconnecting bars respectively connecting the right front leg and the right rear leg, and the left front leg and the left rear leg, and a stay connecting the side connecting bars; wherein a bottom included in a seat is supported on the stay.

In the stroller according to the third aspect of the present invention, the stay is provided with seat support members longitudinally extending in opposite directions from the stay.

DETAILED DESCRIPTION OF THE PREFERRED EMBODIMENTS

First Embodiment

An outline of a stroller will be explained.

Figure 9:
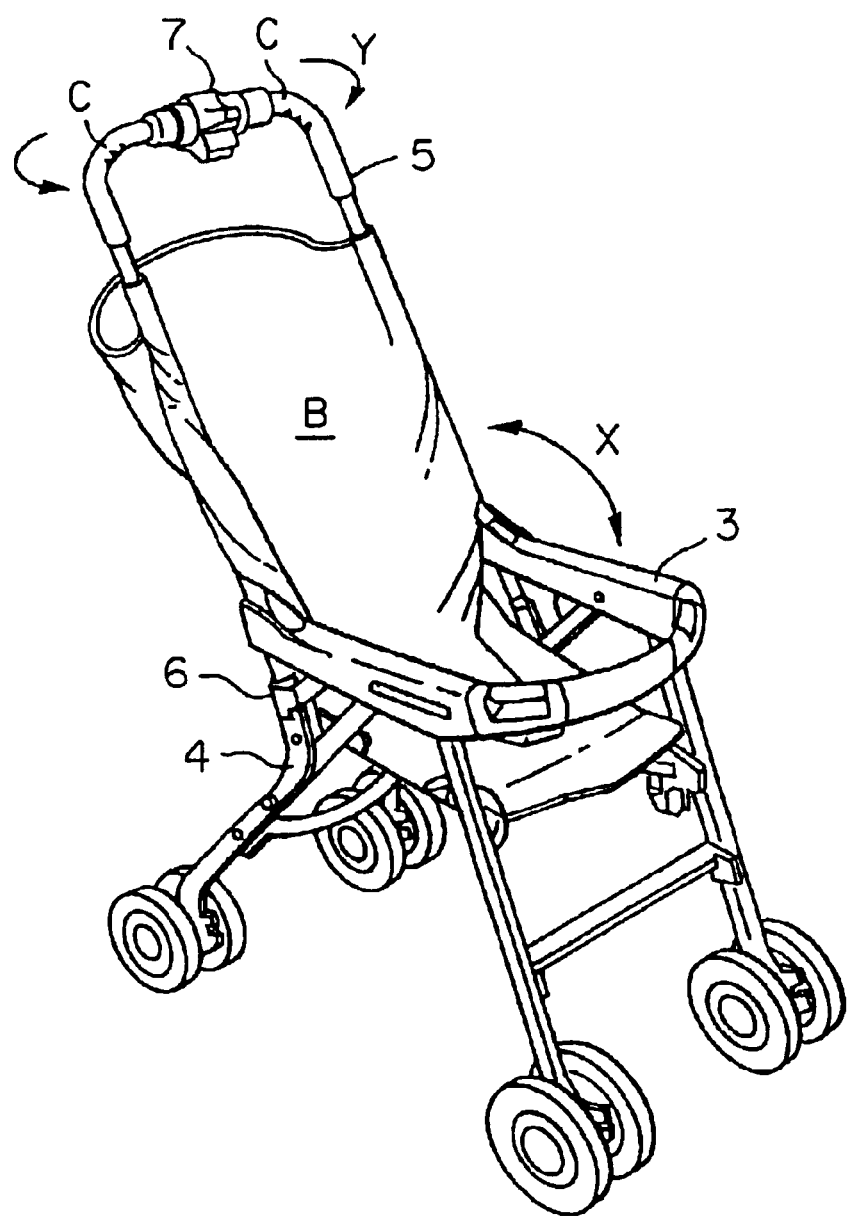
FIG. 9 is a perspective view of a conventional three-folding stroller in an unfolded state.
Figure 10:
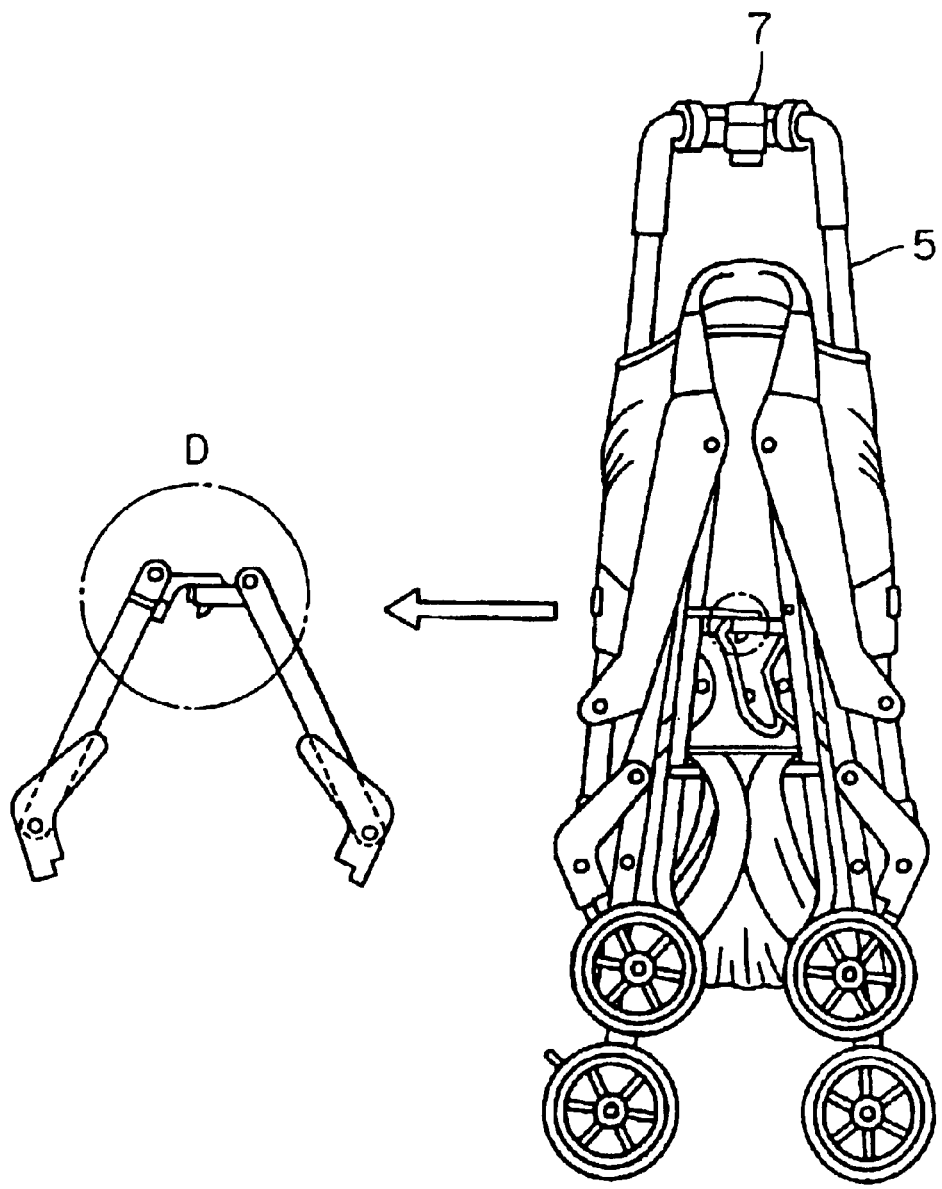
FIG. 10 is a front elevational view of the stroller shown in FIG. 9 in a folded state.

FIG. 9 is a perspective view of a three-folding stroller in an unfolded state, namely, a working state, and FIG. 10 is a view of the same stroller folded in three, and a locking mechanism included in the stroller. A folding operation for folding the stroller from the unfolded state shown in FIG. 9 in three as shown in FIG. 10 will be described with reference to FIGS. 9 and 10.

Referring to FIG. 9, operating wires, not shown, are extended from an operating device 7. Sliders, not shown, are moved by operating the operating wires so as to raise locking members 6 to disengage the locking members 6 from corresponding brackets 4 holding the stroller in an unfolded state, so that the stroller is unlocked.

Then, the stroller is held by opposite side sections C of a handle 5, front wheels or armrests 3 are raised and turned toward a backrest B as indicated by arrow X (a first folding step). A longitudinal dimension of the stroller can be reduced by thus folding the stroller in two. Then, the opposite side sections C of the handle 5 are bent forwardly in direction of arrows Y (a second holding step). A lateral dimension of the stroller can be reduced by thus folding the stroller in three.

The stroller has a seat bottom divided into right and left sections, and a mating mechanism D including mating members respectively connected to inner end parts of the right and left sections. When the stroller is thus folded in three as shown in FIG. 10, the mating members are engaged with each other to lock the stroller in a three-folded state.

A folding stroller of a first embodiment according to the present invention will be described with reference to FIGS. 1 to 8.

Figure 1:
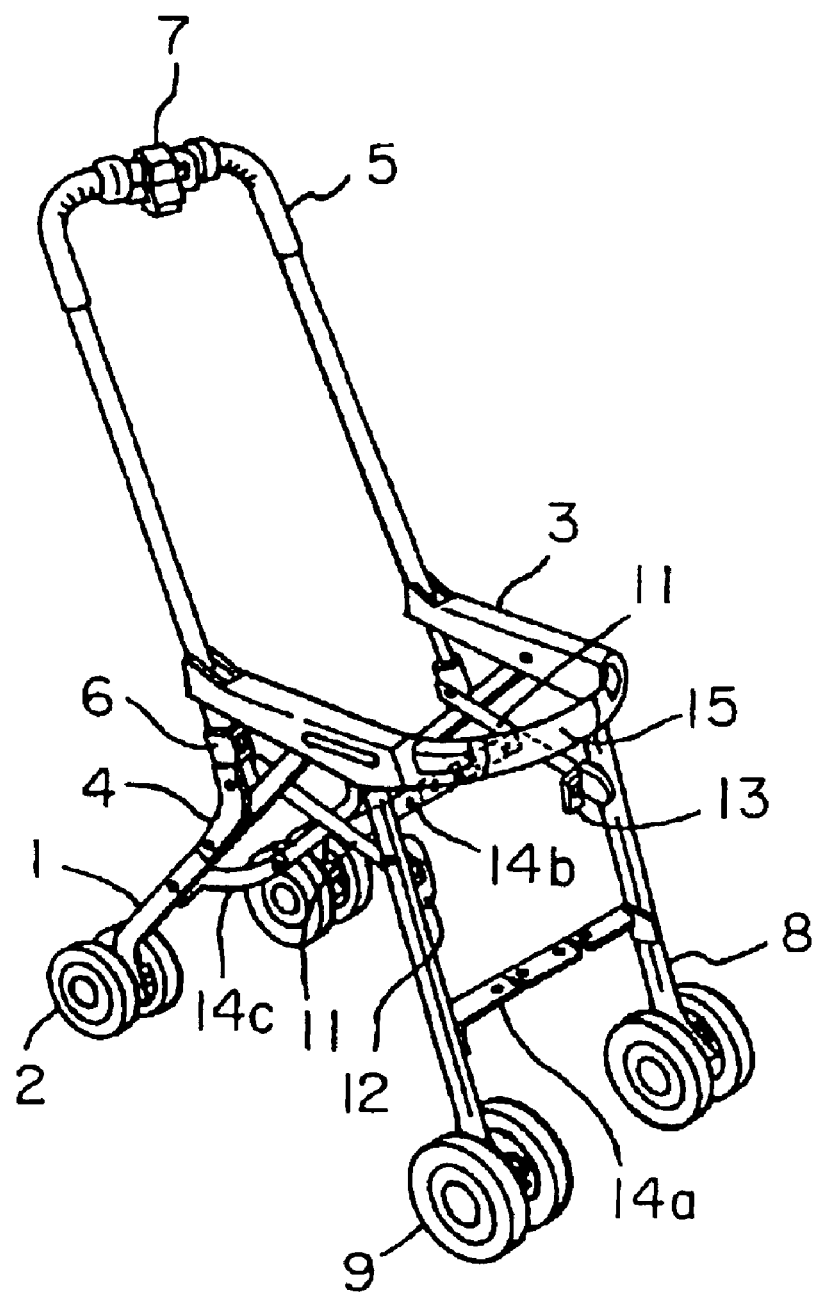
FIG. 1 is a schematic perspective view of a stroller of a first embodiment according to the present invention in an unfolded state.

FIG. 1 shows a three-folding stroller of the first embodiment in an unfolded state in a perspective view. The stroller has right and left rear legs 1. Rear wheels 2 are supported for rotation on lower end parts of the rear legs 1, respectively. The rear wheels 2 are combined with wheel stoppers, not shown, respectively. The wheel stoppers restrain the rear wheels 2 from rotation to park the stroller for a period of time in a desired place. Upper end parts of the rear legs 1 are joined pivotally to substantially middle parts of armrests 3, respectively.

Figure 2:
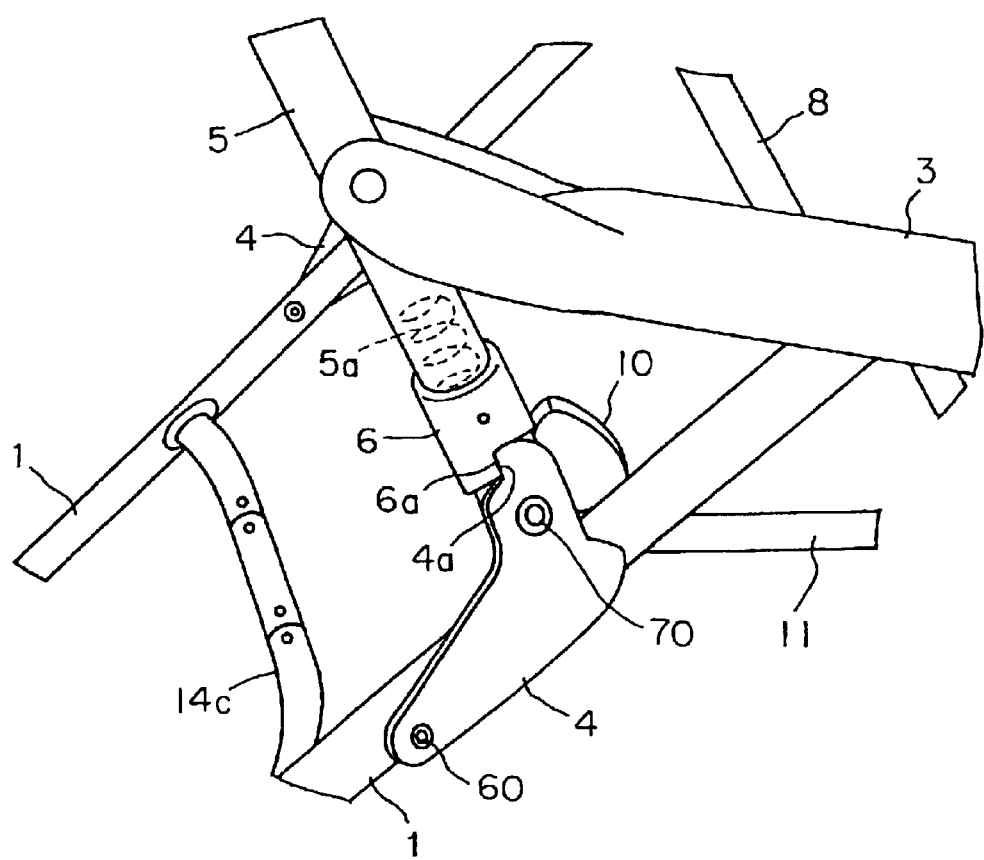
FIG. 2 is a perspective view of a locking mechanism included in the stroller shown in FIG. 1, as viewed from an inner side of the stroller shown in FIG. 1.

Referring to FIG. 2, an L-shaped bracket 4 (connecting member) has one end pivotally connected to an outer side of a substantially middle part of each rear leg 1 via a pin 60, and another end pivotally connected to a lower end of a corresponding side section C of the handle 5, having the shape of an inverted letter U, via a pin 70. A second stopping part 4a and a first stopping part 4b (FIG. 8) are formed in bracket 4. The stopping parts 4a and 4b are spaced a predetermined angular interval apart from each other. The second stopping part 4a is able to engage with a second stopping part 6a formed in a locking member 6. When the second stopping part 4a and the second stopping part 6a are engaged, the stroller is held in an unfolded state. The first stopping part 4b is a recessed part of the bracket 4.

Referring again to FIG. 1, the locking member 6 is connected to the operating device 7 mounted on the middle section of the handle 5 by a wire, not shown, extended through the handle 5. The locking member 6 is moved longitudinally upwardly along a corresponding side section C of the handle 5 by operating the operating device 7 to disengage second stopping part 6a of locking member 6 from second stopping part 4a of bracket 4. The locking member 6 is pushed always toward the bracket 4 via a spring 5a placed inside the handle 5.

Each armrest 3 has one end pivotally joined to the handle 5 and another end pivotally joined to front legs 8. Front wheels 9 are connected to lower end parts of the front legs 8 by swivel mechanisms, not shown. The swivel mechanisms enable smooth turning of the stroller so as to change a moving direction. The swivel mechanisms can be locked and unlocked as occasion demands.

Figure 3:
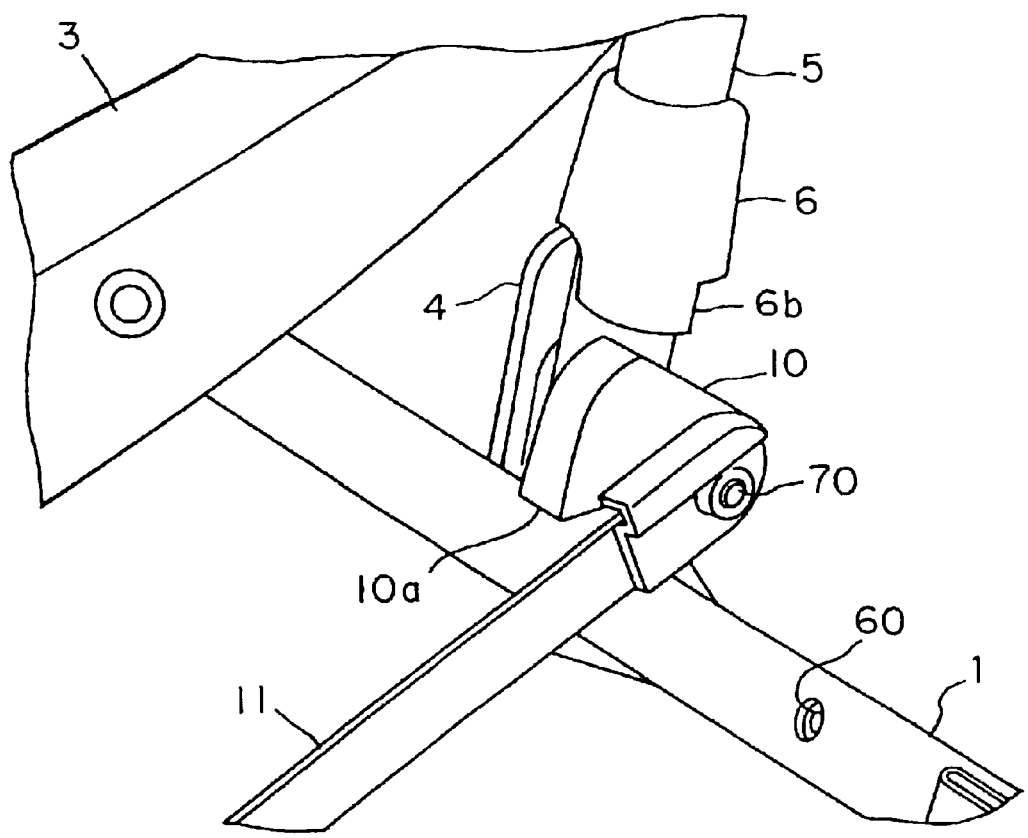
FIG. 3 is a perspective view of the locking mechanism, as viewed from an outer side of the stroller shown in FIG. 1.
Figure 4:
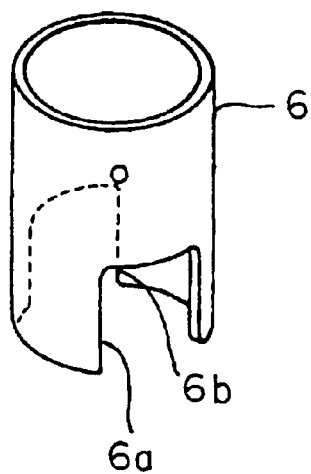
FIG. 4 is a perspective view of a locking member.

Referring to FIG. 3, a holding member 10 is pivotally connected to an inner side of the lower end of each side section C of the handle 5 by the pin 70 opposite to the bracket 4 with respect to the handle 5. The holding member 10 has a first stopping part 10a capable of engaging a first stopping part 6b, diametrically opposite to the second stopping part 6a, of the locking member 6 as shown in FIG. 4. Each of the stopping parts 6a and 6h has a recess of a fixed width formed in a lower end of locking member 6.

Referring to FIG. 3, each of side connecting bars 11 has a rear end attached to the holding member 10. As shown in FIG. 1, a hook 12 and a ring 13 are hinged on middle parts of the right and the left front legs 8, respectively. Front ends of the side connecting bars 11 are attached to the hook 12 and the ring 13, respectively. When the stroller is folded in three, the hook 12 and the ring 13 are engaged to hold the stroller in a folded state.

Connecting bars 14a, 14b and 14c are extended between the front legs 8, between the side connecting bars 11 and between the rear legs 1, respectively. Each of the connecting bars 14a, 14b and 14c are divided into three substantially equal sections, and adjacent sections are joined by two joints, respectively. The middle section of the handle 5, similarly to the connecting bars 14a, 14b and 14c, is divided into three substantially equal sections, and adjacent sections are joined pivotally by two joints, respectively. The joints of the connecting bars 14a, 14b and 14c and the middle section of the handle 5 are aligned substantially in two parallel lines, respectively, so that a body of the stroller can be folded into a U-shape.

The front legs 8, the side connecting bars 11, the rear legs 1, the armrests 3 and the connecting bars 14a, 14b and 14c are essential members of the stroller and are assembled in a frame having a rectangular shape in a plane. A guard 15 is extended between front ends of the armrests 3 to protect a baby seated on the seat of the stroller and to prevent the child from falling forward off the seat.

Figure 5A:
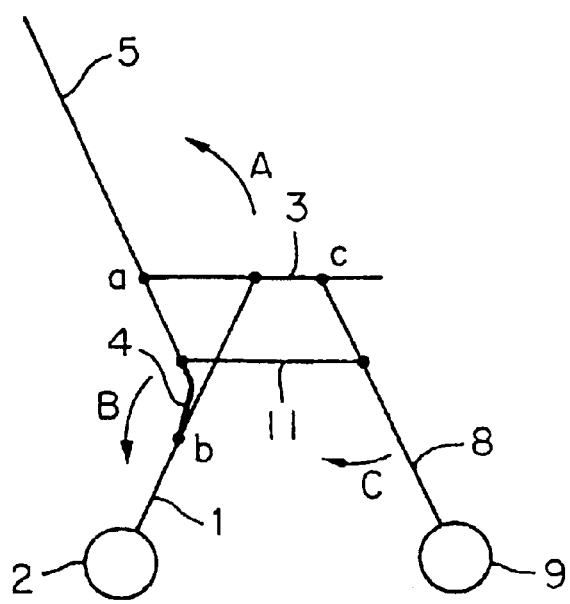
FIGS. 5(a) and 5(b) are skeletal side elevational views of the stroller shown in FIG. 1 in an unfolded state and in a folded state, respectively.
Figure 5B:
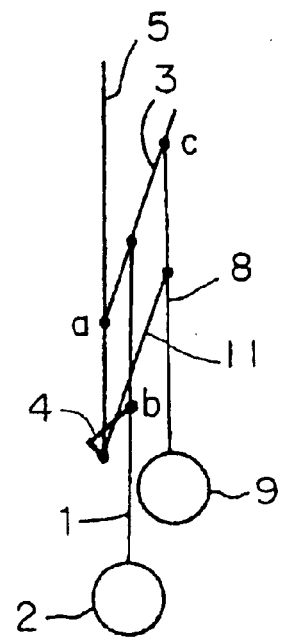

A folding operation for folding the stroller will be described hereinafter. FIGS. 5(a) and 5(b) show the stroller shown in FIG. 1 in an unfolded state and in a folded state, respectively. The operating device 7 is operated so as to raise the locking members 6 along the side sections C of the handle 5 to disengage the locking members 6 from the brackets 4. Then, the armrests 3 are turned relative to the handle 5 in the direction of arrow A about point a. Consequently, upper ends of the rear legs 1 are moved toward the handle 5, and the brackets 4 are turned in the direction of arrow B about point b. As the brackets 4 are thus turned in the direction of arrow B, the front legs 8 are raised and are turned in the direction of arrow C about point c. Thus, the stroller is folded in a so-called two-folded state with the rear legs 1 and the front legs 8 being moved toward a substantially middle part of the handle 5 as shown in FIG. 5(*b*).

Figure 6:
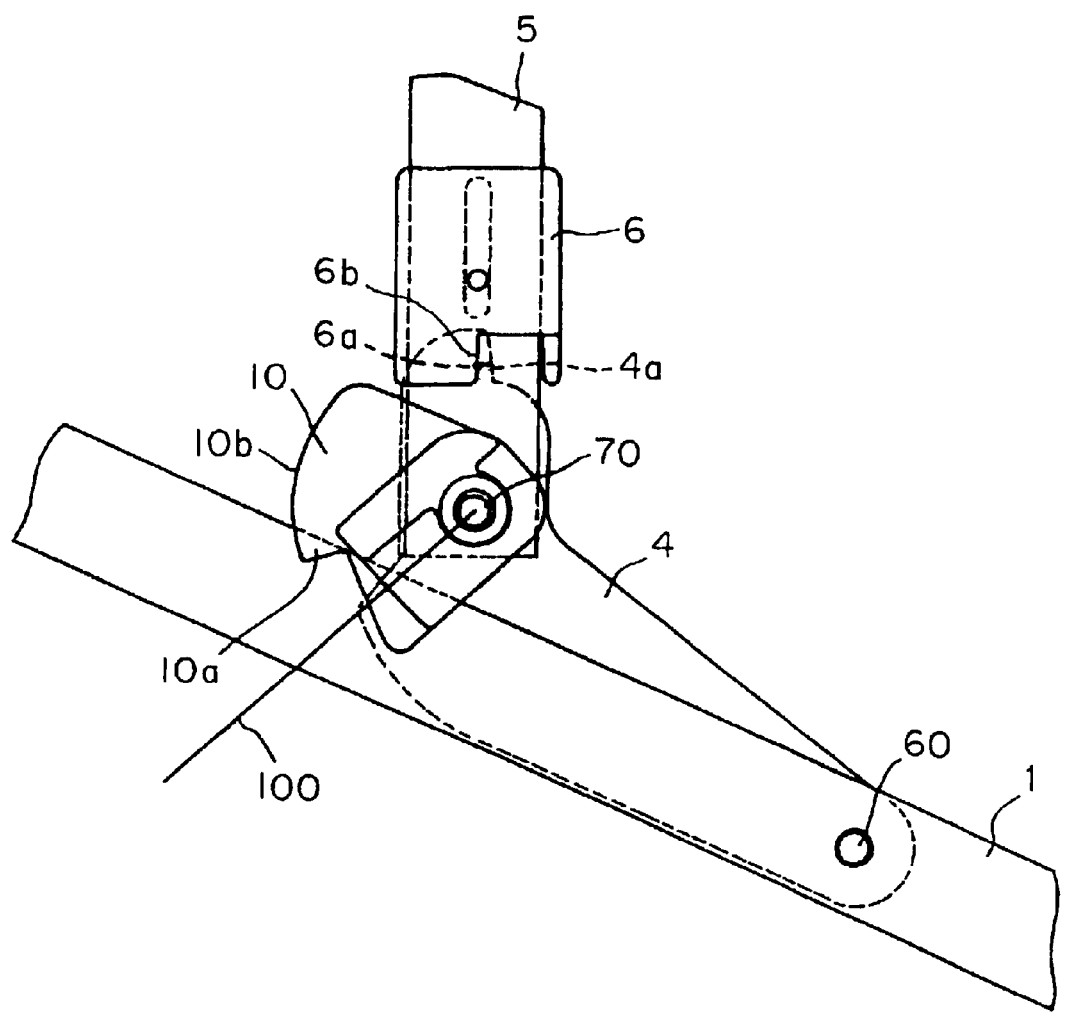
FIG. 6 is a fragmentary side elevational view of the stroller in an unfolded state of assistance in explaining a locking operation of the locking mechanism.
Figure 7:
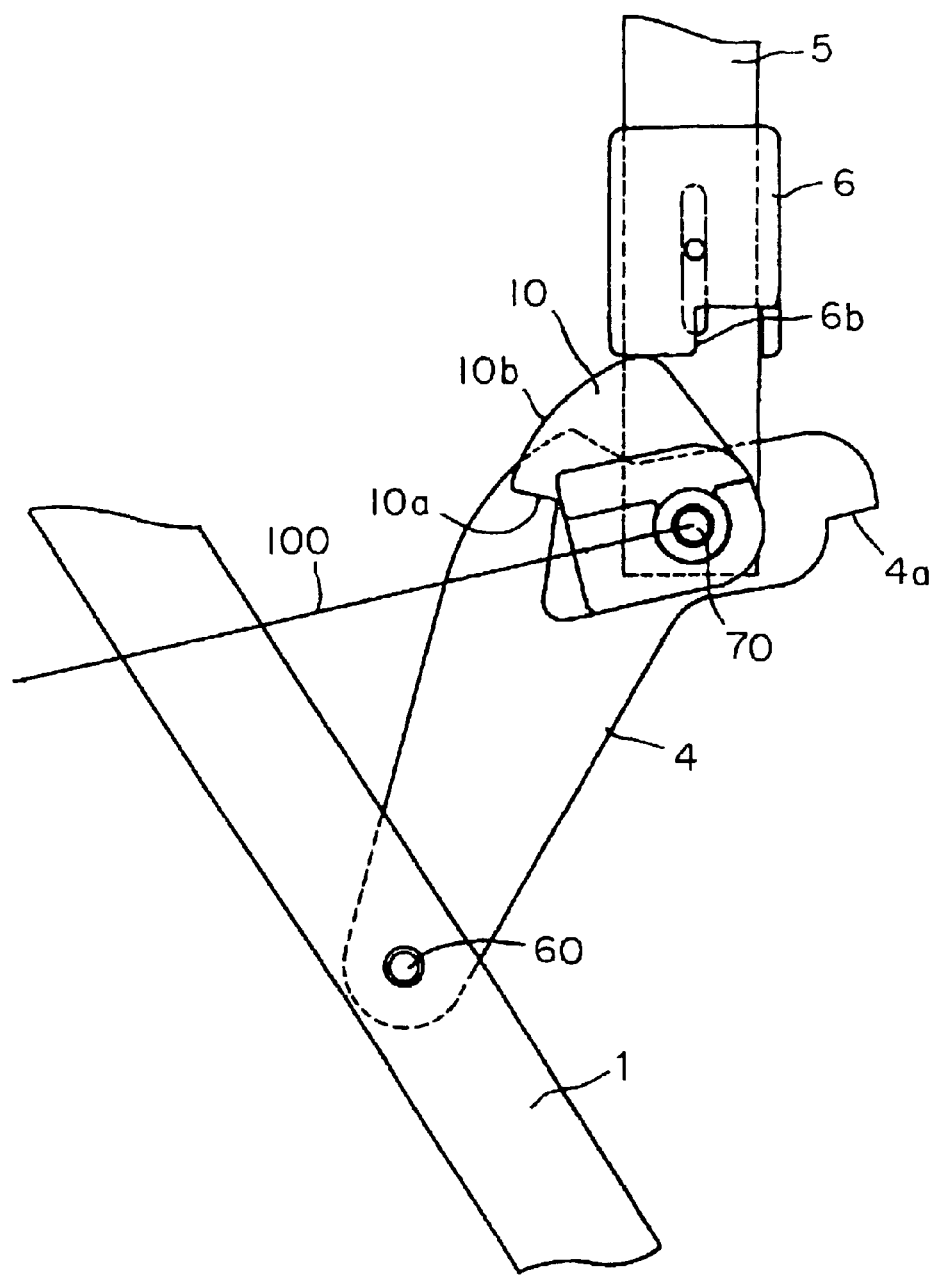
FIG. 7 is a fragmentary side elevational view of the stroller of assistance in explaining the locking operation of the locking mechanism, showing a holding member pushing up the locking member.
Figure 8:
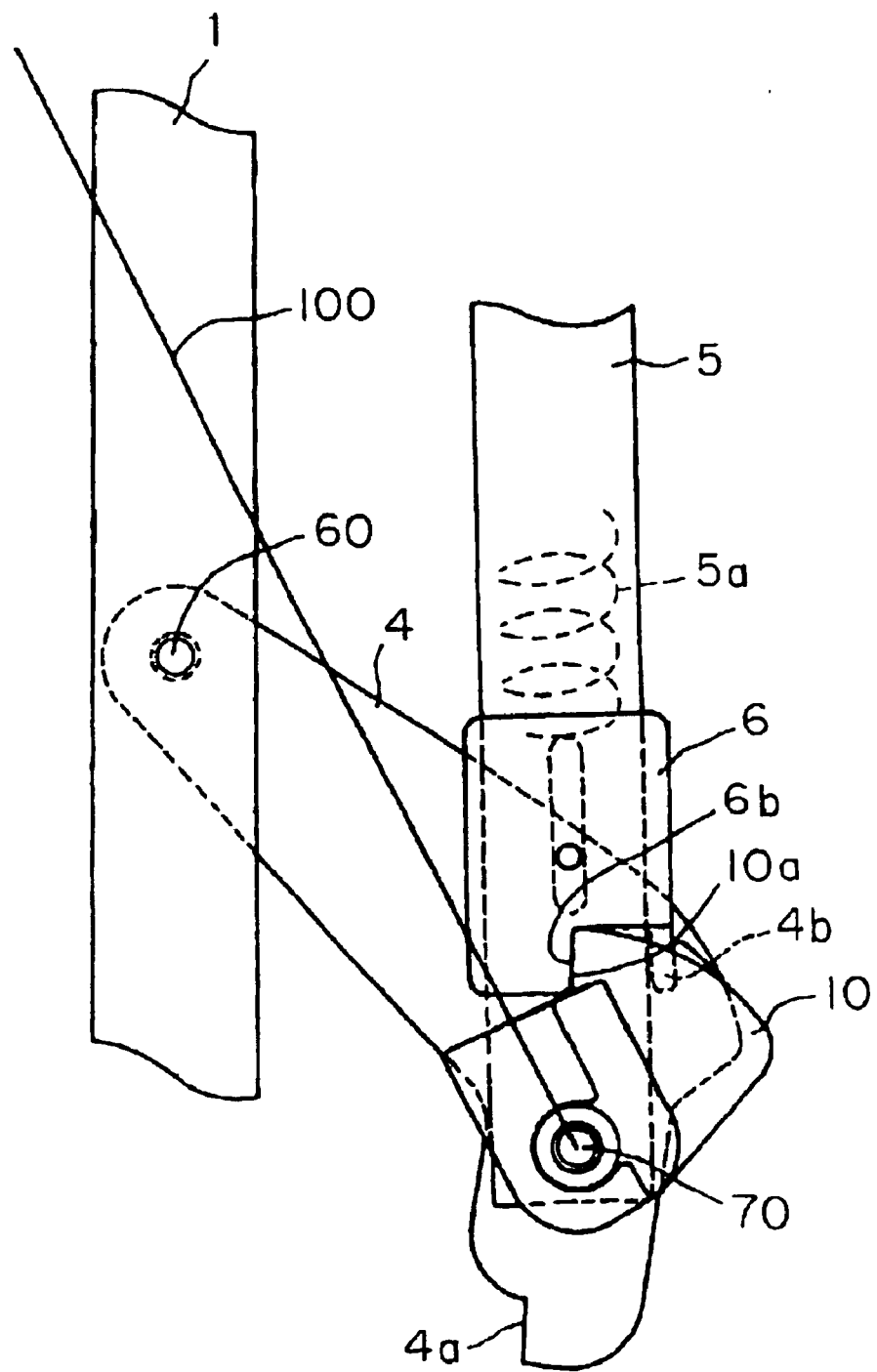
FIG. 8 is a fragmentary side elevational view of the stroller in a folded state of assistance in explaining the locking operation of the locking mechanism.

A locking operation of the locking mechanism of the folding stroller of the first embodiment will be described with reference to FIGS. 6 to 8. FIG. 6 shows the locking mechanism in a state where the stroller is unfolded, FIG. 7 shows the locking mechanism in a state where the holding member 10 has been turned through an angle of about 30° from a position for the unfolded state and the locking member 6 is raised by a working part 10*b* of the holding member 10, and FIG. 8 shows the locking mechanism in a locking state where the stroller is folded.

Referring to FIG. 6, when the stroller is in the unfolded state, second stopping part 4*a* of bracket 4 is engaged with second stopping part 6*a* of locking member 6 to retain the stroller in the unfolded state. In FIG. 6, a line 100 indicates a position and angle of a corresponding side connecting bar 11.

When the operating device 7 is actuated by performing a predetermined operation, such as an operation of pushing a button, to raise locking member 6 along side section C of the handle 5 with the stroller in the unfolded state, the locking member 6 is disengaged from bracket 4 to enable a corresponding rear leg 1 to turn. Then, the handle 5 is held by the opposite side parts thereof, the front wheels 9 are lifted up, or the armrests 3 are turned backward. Consequently, the bracket 4 is turned together with the rear leg 1, and hence holding member 10 supported on pin 70 is turned as shown in FIG. 7.

Then, working part 10*b* of holding member 10 raises locking member 6. Upon arrival of stopping part 10*a* of the holding member 10 at a predetermined position, the locking member 6 is lowered by resilience of spring 5*a*, and stopping part 6*b* of the locking member 6 and the stopping part 10*a* of the holding member 10 are engaged to completely fold the stroller in two. When the stopping part 6*b* of the locking member 6 and the stopping part 10*a* of the holding member 10 are engaged, a part of the locking member 6 engages in stopping part 4*b* of bracket 4 to restrain the bracket 4 and the holding member 10 from turning relative to the handle 5. Thus, the stroller is locked in the two-folded state. The stopping part 6*b* of the locking member 6, and the stopping part 10*a* of the holding member 10 constitute a corresponding locking mechanism.

The two-folded stroller is further folded in three into a U-shape in a plane. The opposite side parts of the handle 5 (FIG. 1) are turned forwardly. Since each of the handle 5 and the connecting bars 14*a*, 14*b* and 14*c* has the pivotal joints at positions dividing a length thereof substantially in three equal sections as mentioned above, the pivotal joints of the handle 5, and the connecting bars 14*a*, 14*b* and 14*c* are aligned substantially in two parallel lines. Therefore, when the opposite side sections of the handle 5 are turned forwardly, the side sections of the connecting bars 14*a*, 14*b* and 14*c* are turned forwardly accordingly. Consequently, the stroller can be folded in three into a U-shape in a plane as shown in FIG. 10.

When the stroller is thus folded into the U-shape to reduce a width thereof, the front ends of the side connecting bars 11 extended between the front legs 8 and the holding members 10 approach each other. Since the hook 12 and the ring 13 are connected to the front ends of the connecting bars, respectively, the hook 12 and the ring 13 are engaged automatically when the front ends of the side connecting bars 11 approach each other to hold the stroller surely in a three-folded state.

When it is desired to unfold this three-folded stroller, the hook 12 and the ring 13 are disengaged by a user, and reverse steps of the above steps shown in FIGS. 6 to 8 are performed.

As mentioned above, according to the above embodiment, the stroller can be securely folded and maintained in the two-folded state by the above simple manner, since holding member 10 has stopping part 10*a* engaged with locking member 6. In addition, since the stroller is maintained in the two-folded state, the stroller can be easily carried in the two-folded state.

Although the invention has been described as applied to a three-folding stroller, the present invention is not limited thereto in its practical application and it goes without saying that the present invention is applicable also to two-folding strollers.

Although locking member 6 engages in first stopping part 4*b* of bracket 4 to hold the stroller in the two-folded state in the stroller of the first embodiment, the bracket 4 does not necessarily need to be provided with the first stopping part 4*b*.

As is apparent from the foregoing description, the folding stroller according to the present invention comprises a plurality of component members assembled in a frame of rectangular shape in a plane, and the handle is connected to one set of the component members from among the plurality of component members by connecting members, and opposite side sections of the handle and parallel component members can be turned forwardly. Since a stopping structure is formed on base parts of the handle to hold the component members in a state where the component members are moved toward the handle, and stopping members hold the stroller in the two-folded state, the stroller can be easily folded and accidental unfolding of the stroller can be prevented.

Second Embodiment

A stroller of a second embodiment according to the present invention will be described with reference to FIGS. 11 and 12. FIG. 12 is a partly cutaway perspective view of a stroller provided with a suspended seat. The stroller has a body including right and left front legs 112 provided with front wheels 111, right and left rear legs 114 provided with rear wheels 113, a substantially U-shaped handle 115, and right and left armrests 116. A detachable guard 117 is extended between the armrests 116. The handle 115 has right and left side pipes 118. Rear ends of the armrests 116 are joined pivotally to parts of the side pipes 118 near lower ends of the same. Upper ends of the front legs 112 are joined pivotally to front ends of the armrests 116, respectively. Upper ends of the rear legs 114 are joined pivotally to middle parts of the armrests 116, respectively. Lower ends of L-shaped brackets 119 are joined pivotally to middle parts of the rear legs 114, respectively. Lower ends of the side pipes 118 are joined pivotally to middle parts of the brackets 119, respectively. When the stroller is unfolded, locking members 120 axially slidably mounted on lower end parts of the side pipes 118 engage stopping parts formed in upper ends of the brackets 119 to hold the stroller in an unfolded state.

A front connecting bar 121 is extended between the right and the left front legs 112. A rear connecting bar 122 is extended between the right and the left rear legs 114. Side connecting bars 123 have front ends pivotally joined to middle parts of the front legs 112, respectively, and rear ends pivotally joined together with the brackets 119 to the lower ends of the side pipes 118, respectively. A stay 124 is extended between middle parts of the side connecting bars 123.

The stroller is held in an unfolded state for use by engaging the locking members 120 mounted on the lower end parts of the side pipes 118 with the stopping parts formed in the upper end parts of the brackets 119. When the locking members 120 are disengaged from the brackets 119 by operating an operating device 125 mounted on the handle 115, the armrests 116 and the side connecting bars 123 can be turned on pins pivotally supporting the armrests 116 and the side connecting bars 123, the front legs 112 and the rear legs 114 are turned so as to extend substantially parallel to each other, and the stroller can be thus folded to facilitate carrying the same.

Each of the handle 115, the front connecting bar 121, the rear connecting bar 122 and the upper connecting bar 124 is divided into three sections, and the three sections are joined by a pair of pivotal joints. The pairs of pivotal joints of the handle 115, the front connecting bar 121, the rear connecting bar 122 and the upper connecting bar 124 are included in two vertical planes, respectively. When the opposite side pipes 118 are turned forwardly after setting the front legs 112 and the rear legs 114 parallel to each other, the opposite side sections of the handle 115, the front connecting bar 121, the rear connecting bar 122 and the stay 124 are turned forwardly, so that the stroller can be folded in three.

A seat 126 is supported on the right and the left side pipes 118 and the side connecting bars 123. A backrest of the seat 126 is connected to the side pipes 118, and a bottom 126b of the seat 126 is attached to the side connecting bars 123 to suspend the seat 126 like a hammock. The stay 124 supports the bottom 126b thereon.

Figure 11:
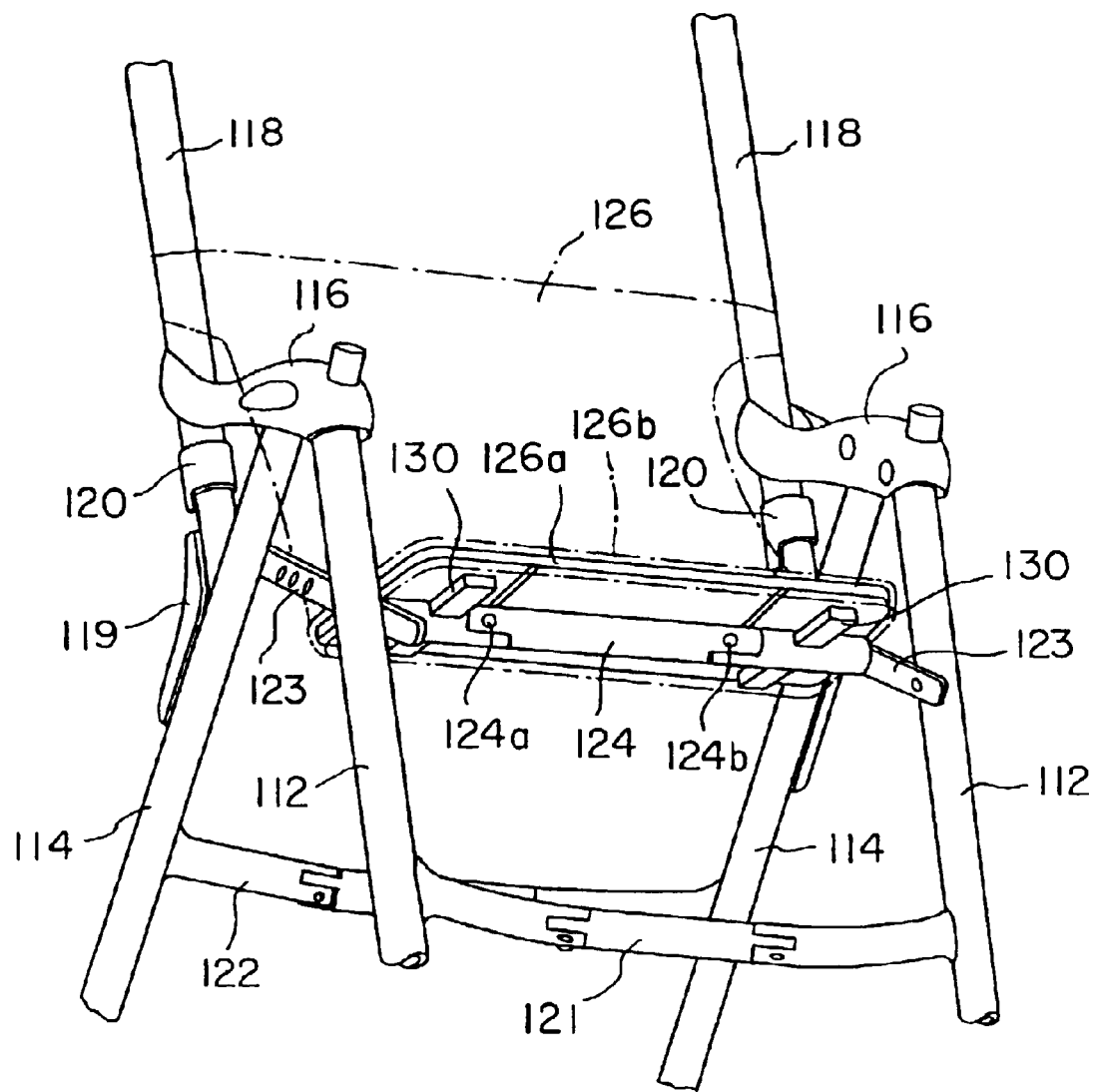
FIG. 11 is a perspective view of an important part of a stroller of a second embodiment according to the present invention.
Figure 12:
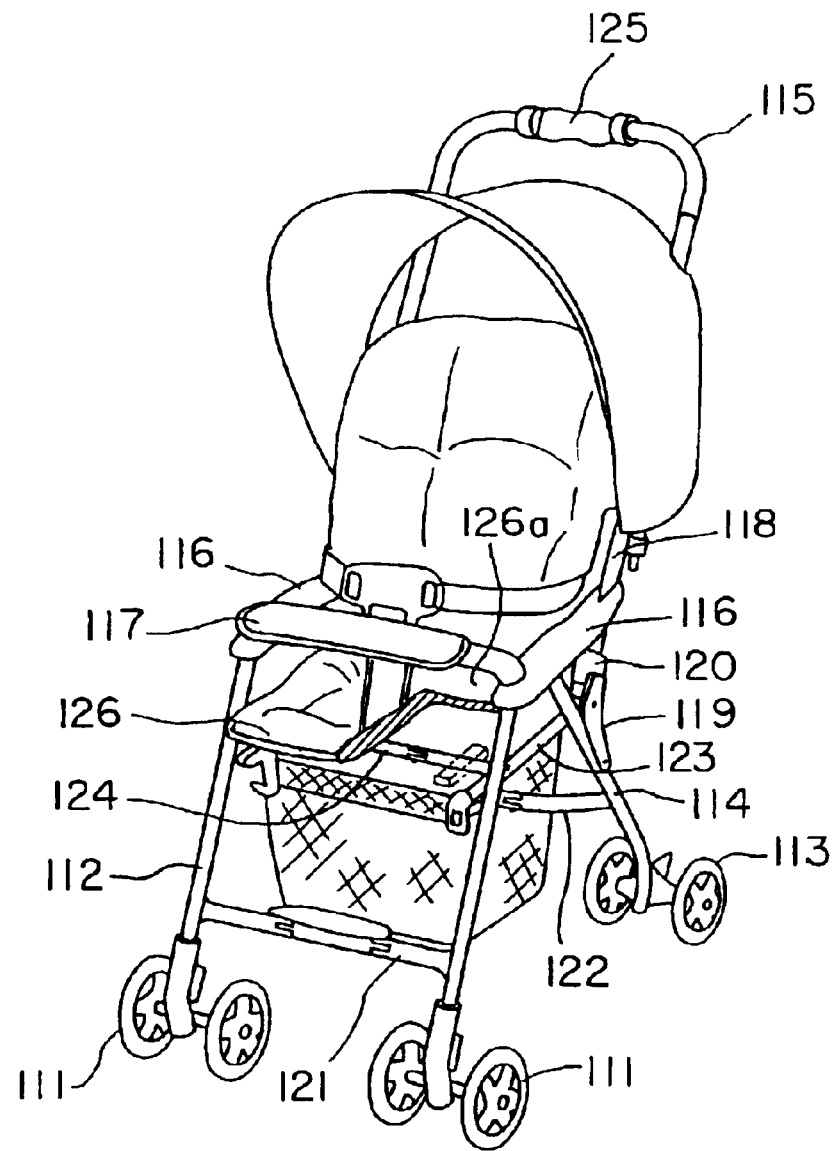
FIG. 12 is a perspective view of the stroller of the second embodiment.

A condition of the seat 126 on the stroller will be described with reference to FIG. 11 showing major parts of the stroller. Front ends of the side connecting bars 123 are joined pivotally to middle parts of the front legs 112, respectively, and rear ends of the side connecting bars 123 are joined pivotally, together with the brackets 119 pivotally joined to the rear legs 114, to the lower ends of the side pipes 118, respectively. The stay 124 is extended between middle parts of the side connecting bar 123. The stay 124 is divided into three sections, and the three sections are connected by two pivotal joints 124a and 124b. Thus, opposite side sections of the stay 124 are able to turn on the pivotal joints 124a and 124b, respectively. Seat support members 130 for supporting the seat 126 extend longitudinally from a front to a rear outside the pivotal joints 124a and 124b, respectively. When the seat 126 is installed on the body of the stroller, the bottom 126b, particularly, a core 126a combined with the bottom 126b is supported by the stay 124 and the seat support members 130.

Since the bottom 126b of the seat 126 is supported on the longitudinally extending seat support members 130, the seat 126 is unable to swing on the stay 124 and stability of the bottom 126b can be improved.

As is apparent from the foregoing description, the stay connecting the side connecting bars connecting the front legs and the rear legs is provided with the longitudinal seat support members, and the bottom of the seat suspended like a hammock is supported on the longitudinal seat support members. Thus, the bottom of the seat is restrained from swinging on the stay and longitudinal movement. Consequently, stability of the bottom can be improved, and a baby riding in the stroller can enjoy improved comfort.

What is claimed is:

1. A stroller comprising:
   rear legs;
   a handle connected to said rear legs, via brackets, wherein said rear legs can be moved relative to said handle to assume folding positions; and
   locking structure between said handle and said rear legs for locking said rear legs and said handle and maintaining the stroller in a folded state when said rear legs are in the folding positions,
   wherein said locking structure includes
   (i) a locking member slidably mounted on an end part of said handle, and
   (ii) a holding member capable of turning together with a respective one of said brackets relative to said handle,
   with said locking member and said holding member including first stopping parts, respectively, with said first stopping parts being engaged with each other when the stroller is in the folded state.

2. The stroller according to claim 1, wherein
   said holding member is capable of turning together with said respective one of said brackets relative to said handle when said rear legs are moved for folding relative to said handle, with said first stopping parts of said holding member and said locking member being engaged with each other when said rear legs are folded relative to said the handle.

3. The stroller according to claim 2, wherein further comprising:
   an elastic member for urging said locking member toward said holding member.

4. The stroller according to claim 3, wherein
   said holding member has a working part capable of moving said locking member against force exerted by said elastic member while the holding member is being turned.

5. The stroller according to claim 1, wherein
   said locking member and said respective one of said brackets include second stopping parts, respectively, with said second stopping parts being engaged with each other when the stroller is in an unfolded state.

6. The stroller according to claim 1, further comprising:
   armrests pivotally joined to said handle, wherein said rear legs are pivotally joined to said the armrests, respectively.

7. The stroller according to claim 1, wherein
   said handle has a middle section and opposite side sections capable of being turned inwardly relative to said middle section such that said handle can be folded.

8. The stroller according to claim 1, further comprising:
   front legs connected to said rear legs by side connecting bars, respectively, wherein said holding member is fixed to a rear end part of a respective one of said side connecting bars.

9. The stroller according to claim 1, further comprising:
   an elastic member for urging said locking member toward said holding member.

10. The stroller according to claim 9, wherein
    said holding member has a working part capable of moving said locking member against force exerted by said elastic member while said holding member is being turned.

11. A folding stroller comprising:

rear legs; and a handle connected to said rear legs via brackets, said handle having opposite side parts turnable forwardly, and said rear legs being movable relative to said handle to assume folding positions; and locking structure between said handle and said the rear legs; for locking said rear legs and said handle and maintaining the stroller in a folded state when said rear legs are in the folding positions, wherein said locking structure includes
  (i) a locking member slidably mounted on an end part of said handle, and
  (ii) a holding member capable of turning together with a respective one of said brackets relative to said handle, with said locking member and said holding member including first stopping parts, respectively with said first stopping parts being engaged with each other when the stroller is in the folded state.

12. The folding stroller according to claim 11, wherein said holding member is capable of turning together with said respective one of said brackets relative to said the handle when said rear legs are moved for folding relative to said handle, with said first stopping parts of said holding member and said locking member are being engaged with each other when said rear legs are folded relative to said handle.

13. The folding stroller according to claim 12, further comprising:

an elastic member for urging said locking member toward said holding member.

14. The folding stroller according to claim 13, wherein said holding member has a working part capable of moving said locking member against force exerted by said elastic member while said holding member is being turned.

15. The folding stroller according to claim 11, wherein said the locking member and said respective one of said brackets include second stopping parts, respectively, with said second stopping parts are being engaged with each other when the stroller is in an unfolded state.

16. The folding stroller according to claim 11, further comprising:

armrests pivotally joined to said handle, wherein said rear legs are pivotally joined to said armrests, respectively.

17. The folding stroller according to claim 11, further comprising:

front legs connected to said rear legs by side connecting bars, respectively, wherein said holding member is fixed to a rear end part of a respective one of said side connecting bars.

18. The folding stroller according to claim 11, further comprising:

an elastic member for urging said locking member toward said holding member.

19. The folding stroller according to claim 18, wherein said holding member has a working part capable of moving said locking member against force exerted by said elastic member while said holding member is being turned.

* * * * *